United States Patent
Brown et al.

(10) Patent No.: US 8,341,958 B2
(45) Date of Patent: Jan. 1, 2013

(54) SHAPE MEMORY ALLOY ACTUATED DEVICE

(76) Inventors: James Holbrook Brown, Costa Mesa, CA (US); Jeffrey Wayne Brown, San Jose, CA (US)

(*) Notice: Subject to any disclaimer, the term of this patent is extended or adjusted under 35 U.S.C. 154(b) by 619 days.

(21) Appl. No.: 11/782,939

(22) Filed: Jul. 25, 2007

(65) Prior Publication Data

US 2008/0022674 A1    Jan. 31, 2008

Related U.S. Application Data

(60) Provisional application No. 60/832,933, filed on Jul. 25, 2006.

(51) Int. Cl.
 F16K 31/00    (2006.01)
 E05B 49/00    (2006.01)
(52) U.S. Cl. ............... 60/527; 60/528; 70/278.7; 70/280
(58) Field of Classification Search ............ 60/527–529; 70/277, 278.7, 280
 See application file for complete search history.

(56) References Cited

U.S. PATENT DOCUMENTS

| | | | |
|---|---|---|---|
| 2,321,286 A * | 6/1943 | Etsel et al. | 49/139 |
| 2,793,898 A * | 5/1957 | Roethel | 292/280 |
| 7,118,097 B2 * | 10/2006 | Moriyama et al. | 261/39.4 |
| 2003/0005926 A1 * | 1/2003 | Jones et al. | 128/200.23 |
| 2005/0115235 A1 | 6/2005 | Mernoe | |
| 2007/0074753 A1 * | 4/2007 | Altali et al. | 136/243 |

FOREIGN PATENT DOCUMENTS

| | | |
|---|---|---|
| JP | 2001-3850 | 1/2001 |
| JP | 2004-100537 | 4/2004 |
| WO | 2004097218 | 11/2004 |

OTHER PUBLICATIONS

International Search Report for International Application No. PCT/US2007/086036 dated Oct. 15, 2008.
Written Opinion for International Application No. PCT/US2007/086036 dated Oct. 15, 2008.

* cited by examiner

*Primary Examiner* — Hoang Nguyen
(74) *Attorney, Agent, or Firm* — Calfee, Halter & Griswold LLP

(57) ABSTRACT

A shape memory alloy (SMA) actuated device capable of stress inducing the SMA to its martensite state to reset the device. The device having at least one SMA wire utilized to move a movable member from a first position to a second position. The device further configured to utilize force from a first source to reset the device when the SMA is at or below the first temperature, and utilize force from at least a second source to reset the device when the SMA is above the first temperature.

22 Claims, 13 Drawing Sheets

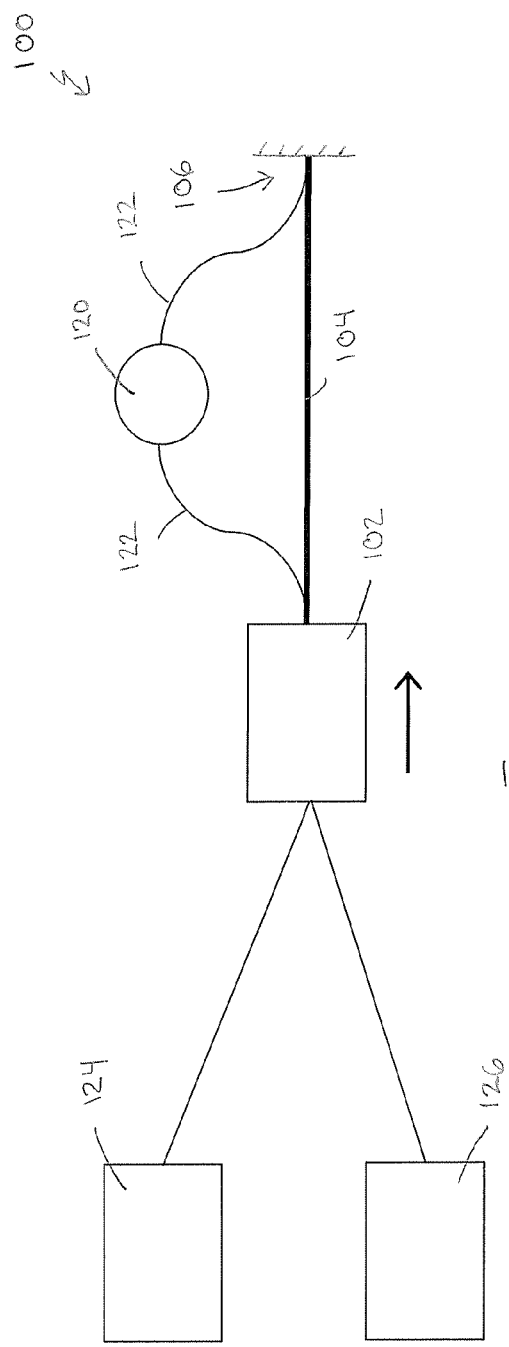
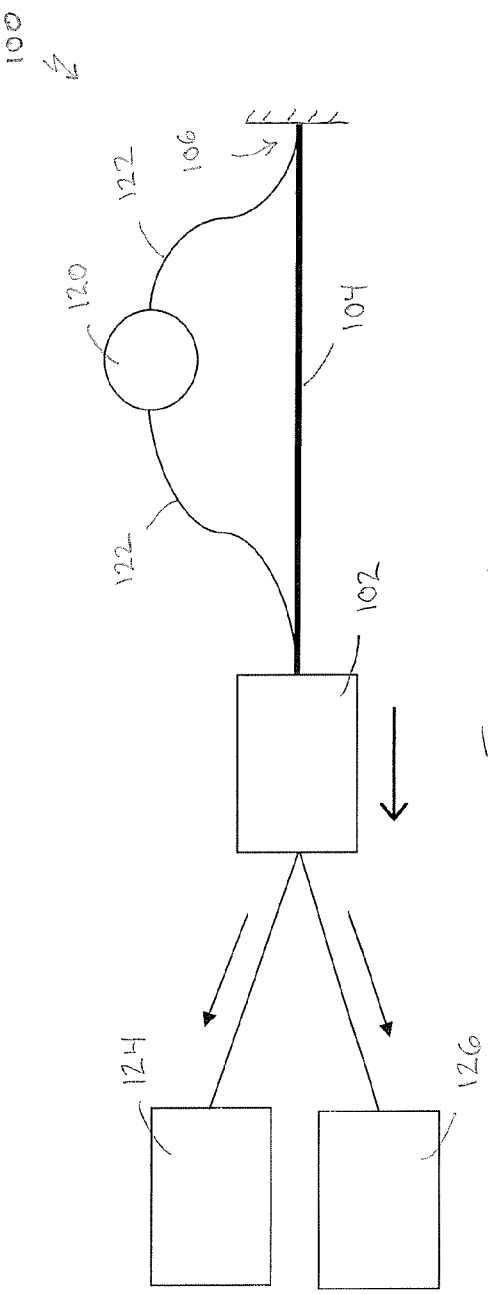
Figure 1B
Figure 1A

SHAPE MEMORY ALLOY ACTUATED DEVICE

RELATED APPLICATIONS

This application claims priority to, and ay other benefit of, U.S. Provisional Patent Application Ser. No. 60/832,933 filed Jul. 25, 2006, for SHAPE MEMORY ALLOY (SMA) ACTUATED DEVICE CAPABLE OF EASILY OPERATING AT AMBIENT TEMPERATURES EQUAL TO OR GREATER THAN 80° C., the entire disclosure of which is fully incorporated herein by reference.

BACKGROUND

Shape memory alloys (SMAs) are metallic alloys that may recover apparent permanent strains when they are heated above a certain temperature. SMAs have two stable states or phases; a hot or austenite state and a cold or martensite state. The temperatures at which the SMA changes states (i.e. its crystallographic structure) are a characteristic of the particular alloy. Selecting the material composition of the alloy and anneal temperatures of the alloy may be used to control the alloy's transition temperatures.

In the austenite state, the alloy is hard and rigid, while in the martensite state, the alloy is softer and flexible. In the martensite state, the SMA may be stretched or deformed by an external force. Upon heating, the SMA will return to its austenite state and contract or recover any reasonable stretch that was imposed on it. Thus, the SMA recovers with more force than was required to stretch it out. This exerted force upon contraction may be used to perform any number of tasks such as, but not limited to, turning a device on or off, opening or closing an object, or actuating a device or object.

SUMMARY OF THE INVENTION

In an illustrated embodiment of a device applying at least some of the principles of the invention, a SMA actuated device is disclosed. In one embodiment, the SMA actuated device is electronically actuated and configured such that an external force may be used to stress induce the SMA to its martensite state, if required, to reset the device.

In another embodiment, the SMA actuated device utilizes force from a first source to reset the device when the SMA is at or below the first temperature, and utilizes force from at least a second source to reset the device when the SMA is above the first temperature.

In a further embodiment, the SMA actuated device includes a first movable member that is movable between a first position and a second position and at least one SMA wire(s) that is coupled to the first movable member. The SMA wire(s) moves the first movable member from the first position to the second position when the SMA wire(s) is heated above its austenite transformation temperature. When the SMA wire(s) cools to its martensite transformation temperature, a force from a first source stretches the SMA wire(s) to return the first movable member to the first position. If the SMA wire(s) does not cool to its martensite transformation temperature, a force from a second source stress induces the SMA wire(s) to its martensite state and stretches the SMA wire(s) to return the first movable member to the first position.

In yet another embodiment, an SMA actuated device is capable of easily operating at ambient temperatures of about 80° C. or higher. The device uses an external force applied to the device to raise the martensite transformation temperature of the SMA, which allows the device to reset in ambient temperatures about 80° C. or higher.

Further features and advantages of the invention will become apparent from the following detailed description made with reference to the accompanying drawings.

BRIEF DESCRIPTION OF THE DRAWINGS

In the accompanying drawings, which are incorporated in and constitute a part of the specification, embodiments of the invention are illustrated, which, together with the detailed description given below, serve to exemplify embodiments of the invention:

FIG. 1A is a schematic representation of a first embodiment of an exemplary shape memory alloy actuated device as disclosed in the present application in a first position;

FIG. 1B is a schematic representation of the device of FIG. 1A in a second position;

DETAILED DESCRIPTION

Figure 2:
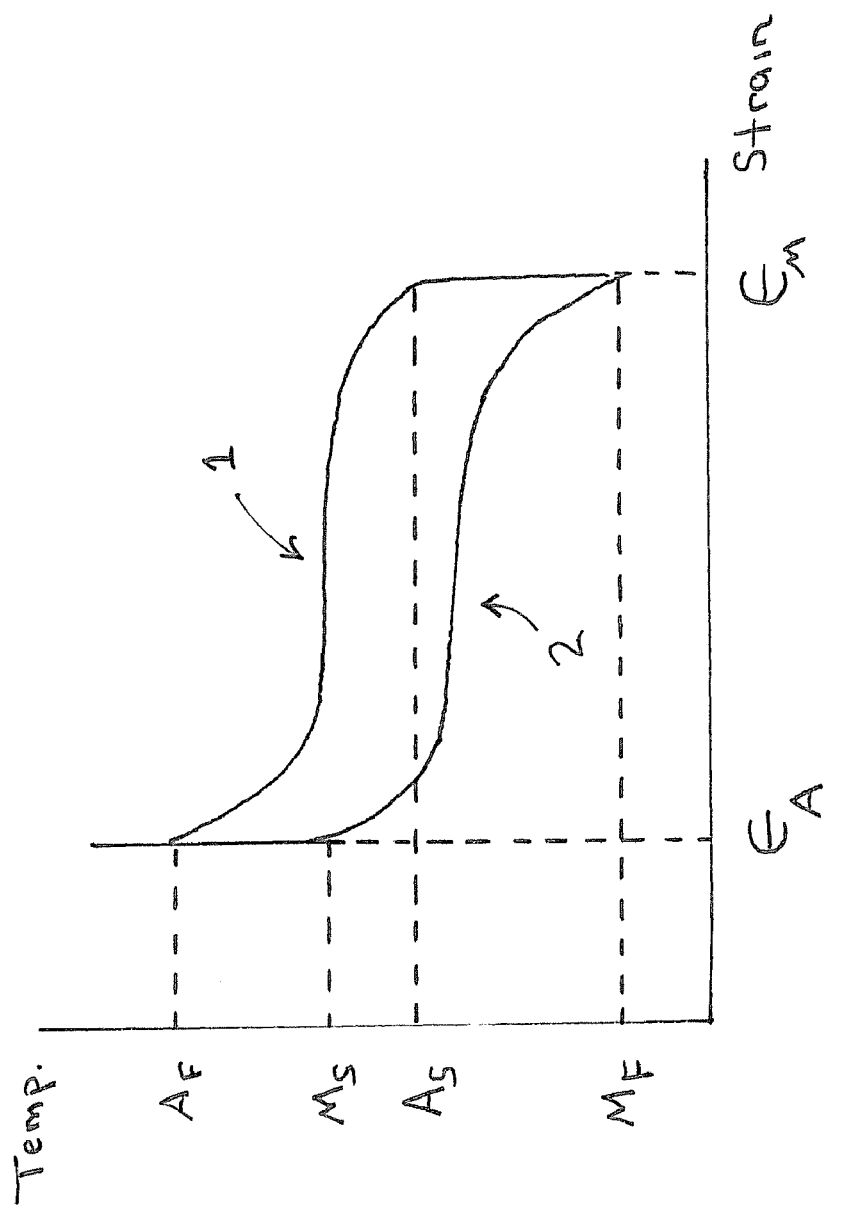
FIG. 2 is a graph illustrating the behavior of a shape memory alloy as disclosed in the present application.

While various aspects and concepts of the invention are described and illustrated herein as embodied in combination in the embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, or representative values and ranges may be included to assist in understanding the present invention however, such values and ranges are not to be construed in a limiting sense and are intended to be critical values or ranges only if so expressly stated.

For the purposes of this application, the terms attach (attached), connect (connected), and link (linked) are not limited to direct attachment, connection, or linking but also include indirect attachment, connection, or linking with intermediate parts, components, or assemblies being located between the two members being attached, connected, or linked to one another. Furthermore, positional terms such as upper, lower, top, bottom, upward, downward, horizontal, and vertical are merely references used herein for convenience of explanation when referring to the Figures and form no structural or use limitation or reference for the device.

FIGS. 1A and 1B are schematic representations of a first embodiment of an exemplary SMA actuated device 100 as disclosed in the present application. The device 100 includes a first movable member 102 that is movable between a first position and a second position and is connected to a SMA member(s) 104, which may be one or more. In the depicted embodiment, the SMA member(s) are realized as wire(s). The SMA member(s) 104, however, may be any suitable SMA object. The first movable member 102 may be connected to the SMA wire(s) in any suitable manner. Any connection that allows the SMA wire(s) to move the first movable member 102 when the SMA wire(s) changes state is suitable. In the illustrated embodiment, the SMA wire(s) 104 has a first end 106 that is fixed relative to the first movable member 102 and a second end 108 that attaches to the first movable member.

FIG. 2 illustrates a temperature vs. strain graph of the SMA wire(s) 104 with a first constant stress load imposed upon the wire(s). $M_S$ denotes the temperature at which the SMA wire (s) generally starts to change from austenite to martensite upon cooling and $M_F$ denotes the temperature at which the transition is generally finished. Accordingly, $A_S$ and $A_F$ denote the temperatures at which the reverse transformation from martensite to austenite generally starts and generally finishes, respectively. As illustrated, the start temperature $M_S$ and finish temperature $M_F$ of the SMA wire(s) when transitioning to the martensite state differs from the start temperature $A_S$ and finish temperature $A_F$ of the SMA wire(s) when transitioning to the austenite state. This internal hysteresis is a material property of the SMA used.

The amount of force or load exerted on the SMA wire(s) can shift/raise/lower the transition temperature at which the state changes occur. A higher stress load on the SMA wire(s) increases the start and finish temperatures of both transitions. Thus, the transition temperatures at a higher constant stress are greater than the transition temperatures at the lower constant stress. Therefore, changing the amount of stress on the SMA wire(s) impacts the temperatures at which the wire(s) transition between states.

Referring again to FIGS. 1A and 1B, an electric power source 120 is in circuit communication with the SMA wire(s) 104 in a manner that allows the power source to send an electric current through the SMA wire(s). In the depicted embodiment, a pair of electrical wires 122 form a circuit with the shape memory alloy wire(s) 104. When an electric current passes through the SMA wire(s) 104, the wire(s) heat up to their austenite transition temperature, which causes the wire (s) to change state and contract (i.e. shorten). The force upon contraction moves the movable actuator member 102 to the second position, as illustrated in FIG. 1B.

The device 100 includes a first source 124 of work/force and/or a linkage or component for transferring force from a first source of work/force to the SMA wire(s) 14. In other words, the device may include a first source of force that acts on the SMA wire(s) or the device may include a means for receiving and transferring an external force to the wire(s). The first source 124 may be configured in a variety of ways. Any source of force capable of applying a tensile load to the SMA wire(s) that is sufficient to stretch the wire(s) and move the first moveable member 102 to the first position may be used. In the depicted embodiment, for example, the first force source 124 may be a bias element such as, but not limited to, a spring. When the electric current is removed from the SMA wire(s) 104, the SMA wire(s) may cool down to the martensite transition temperature and change state from austenite to martensite. Once the SMA wire(s) 104 returns to the martensite state, the tensile force being applied from the first force source 124 stretches the SMA wire(s) and returns the first movable member 102 to the first position; thus, resetting the device.

The device 100 also includes a second source 126 of work/ force and/or linkage or component for transferring force from the second force source to the SMA wire(s) 104. The second source 126 is adapted to stress induce the SMA wires(s) 104 to change state to the martensite. The second force source 126, as with the first force source 124, may be configured in a variety of ways. Any source of force capable of applying a tensile load to the SMA wire(s) that is sufficient to stress induce a state change to martensite in the SMA wires(s) may be used. In the depicted embodiment, for example, the second force source is external to the device, such as person manually applying a force that is transmitted to the SMA wire(s) through a linkage.

When the electric current is removed from the SMA wire (s) 104, if the ambient temperature surrounding the device 100 is high enough that the SMA wire(s) does not cool down to the martensite transition temperature, the device is configured to stress induce the state change in the SMA wire(s). The force from the second source 126 induces a state change in the SMA wire(s) and alone or in conjunction with the force from the first source 124, stretches the SMA wire(s) and returns the first movable member 102 to the first position; thus, resetting the device.

The device 100, therefore, electrically actuates and utilizes force from a first source to reset the device when the temperature of the SMA wire(s) is below a certain value and utilizes force from a second source to reset the device when the temperature of the SMA wire(s) is at or above the value. Thus, even when the SMA wire(s) is hotter than its martensite transition temperature, the device may operate effectively by utilizing a higher load to stress induce the state change to martensite.

FIGS. 3-8 illustrates a second embodiment of an exemplary SMA actuated device 200 as disclosed in the present application. In the depicted embodiment, the device 200 is configured to releasably retain a member such as in a door or trunk latching mechanism. The principles of the device 200, however, can be used in a wide variety of applications.

Figure 3:
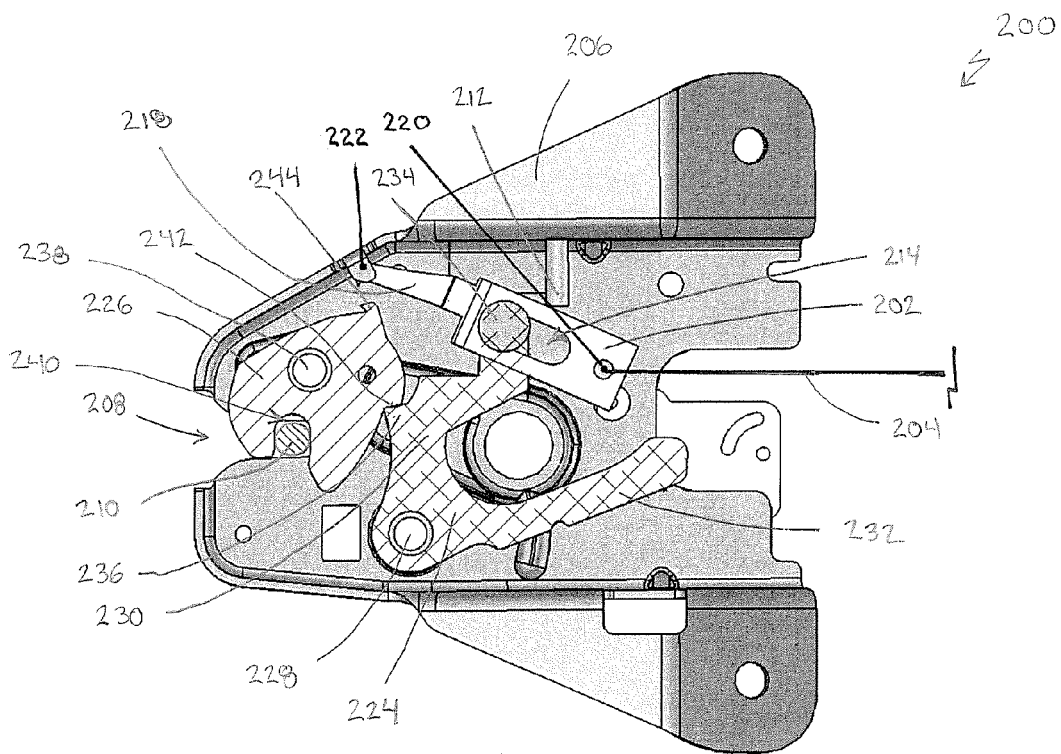
FIG. 3 is a partial side view of a second embodiment of an exemplary shape memory alloy actuated device as disclosed in the present application in a first position.

Referring to FIG. 3, the device 200 includes a housing 206 configured to mount adjacent a door by any suitable means, such as, for example, fasteners. Disposed within the housing 206, is a first movable member or link 202 that connects to at least one SMA wire(s) 204. The housing 206 includes a recessed area 208 for receiving a door striker 210. The first movable member 202 is movable between a first position (FIG. 1A) and a second position (FIG. 1B). The device 200 includes a bump or guide 212 that directs movement of the first movable member 202, as described in more detail below.

The movable member 202 may be configured in a variety of ways. Any structure capable of linking the SMA wire(s) 204 to one or more sources of force may be used. In the depicted embodiment, the movable member 202 is configured as a generally rectangular component having a slot 214 extending along a portion of its length and a coupling portion 216 situated on an extending arm 218. The coupling portion 216 may be configured in a variety of ways. Any structure capable of temporarily coupling with another component of the device 200 may be used. In the depicted embodiment, the coupling portion 216 is configured as a hook or barb (see FIG. 4).

The first movable member 202 includes an opening 220 that serves as an attachment point for the SMA wire(s) 204. In addition, a coil spring or other bias element (not shown) may be disposed between the housing 206 and the first movable member 202 to bias the first movable member toward the first position. In the embodiment of FIGS. 3-8, the spring (not shown) may attach to the housing 206 at a first attachment point 222 and may attach to the first movable member 202 at the opening 220.

The SMA actuated device 200 also includes a second movable member 224 realized as a pawl and a third movable member 226 realized as a ratchet. The pawl 224 and ratchet 114 may be configured in a variety of ways. Any structure that may cooperate to receive and hold a door striker 210 may be used. In the depicted embodiment, the pawl 224 in generally U-shaped structure that is pivotally mounted to the housing 206 at a pivot point 228. The pawl 224 has a first arm 230 and a second arm 232. The first arm 230 has a pin 234 at its distal end that is received within the slot 214 on the first movable member 202. The pawl 224 and the first movable member 202, however, may be connected in any suitable manner.

The pawl 224 also includes a portion for interfacing with the ratchet 226. The portion may be configured in a variety of ways. Any structure capable of interfacing with the ratchet to restrict movement of the ratchet may be used. In the depicted embodiment, the portion is configured as a projection 236 extending outward from the first arm 230 toward the ratchet 226.

A torsion spring (not shown) may be disposed between the housing 206 and the pawl 224 to bias the pawl toward the ratchet 226 (i.e. in a counter-clockwise direction as illustrated in FIGS. 3-8).

The ratchet 226 is pivotally mounted to the housing 206 at a pivot point 238. The ratchet 226 includes a recess 240, a surface 242 for interfacing with the pawl 224, and an engagement portion 244 for interfacing with the movable member 202, realized in the depicted embodiment as a hook or barb for interfacing with the movable member 202. A torsion spring (not shown) may be disposed between the housing 206 and the ratchet 226 to bias the ratchet to an open position (i.e. in a clockwise direction as illustrated in FIGS. 3-8).

An electric power source (not shown), such as for example, a battery, is in circuit communication with the SMA wire(s) 204 in a maimer that allows the power source to send an electric current through the SMA wire(s). A control unit may control the application of the electric current through the SMA wires(s).

FIGS. 3-8 illustrate the operation of the device. Referring to FIG. 3, the device 200 is in a latched position. In the latched position, the striker 210 is positioned within the slot 208 of the housing 206 and within the recessed area 240 of the ratchet 226. The pawl 224 is engaged with the ratchet 226 such that the pawl 224 holds the ratchet in the latched position. The first movable member 202 is in the first position. In the first position, the hook or barb 216 (see FIG. 4) is spaced away from the hook or barb 244 on the ratchet. In the latched position, the SMA wire(s) are in the martensite state and are stretched by the return spring (not shown).

Figure 4:
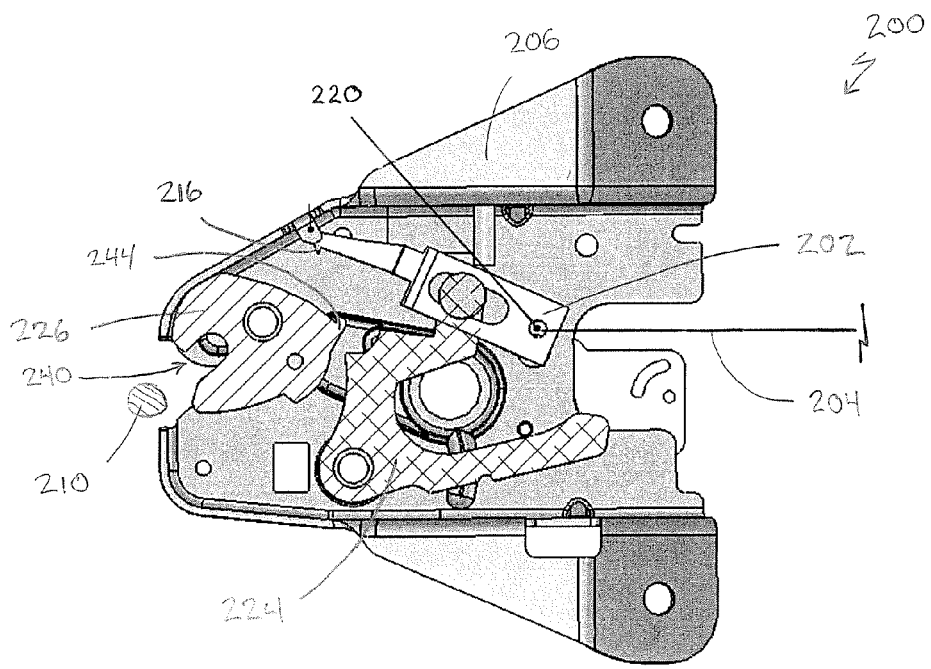
FIG. 4 is a partial side view of the device of FIG. 3 in a second position.

When an electric current is passed through the SMA wire (s) 204, the wire(s) heats up above its austenite transition temperature and contracts (i.e. changes to the austenite state). As shown in FIG. 4, when the SMA wire(s) 204 starts contracting, it pulls the first movable member 202, which in turn, rotates the pawl 224 out of engagement with the ratchet 226. Because the ratchet 226 is biased to an open position by the a torsional spring (not shown), the ratchet moves to an open position and ejects the striker 210 from the slot 240 (i.e. opens the door or pops the trunk lid).

Figure 5:
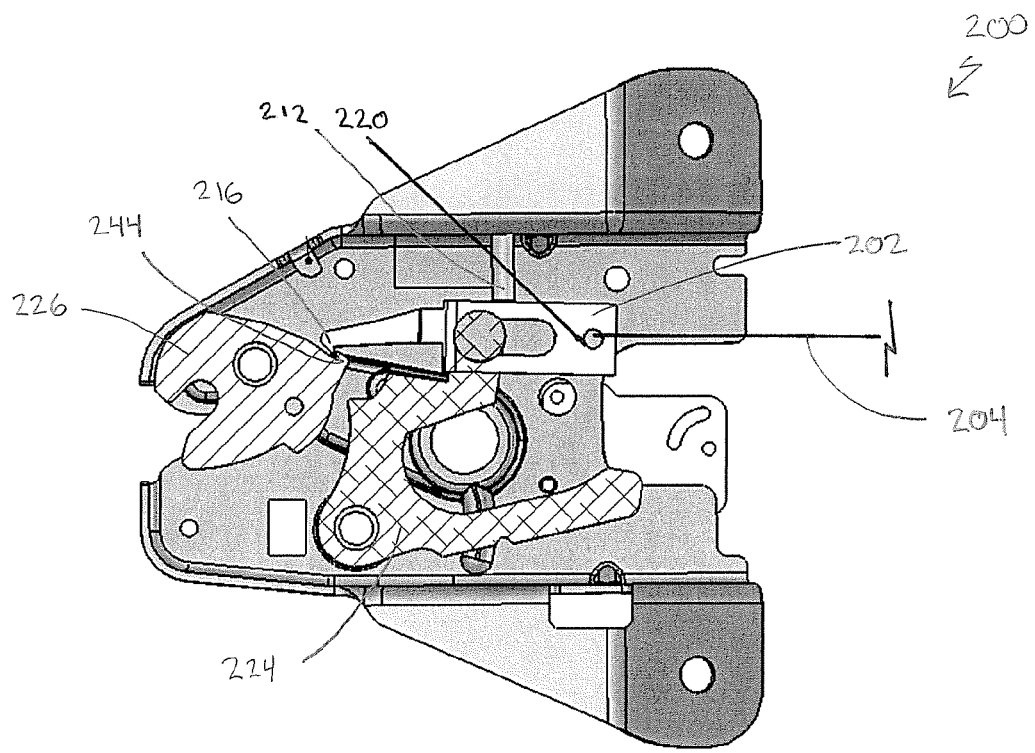
FIG. 5 is a partial side view of the device of FIG. 3 in a third position.

As shown in FIG. 5, as the SMA wire(s) 204 continues to contract, it continues to pull the first movable member 202 which engages the guide 212. The position and configuration of the of the guide 212 and the SMA wire(s) 204 are such that the first movable member 202 rotates as it is pulled to the second position (shown in FIG. 5). The rotation of the first movable member 202 results in the hook 216 being positioned near or adjacent the hook 244 on the ratchet 226.

Figure 6:
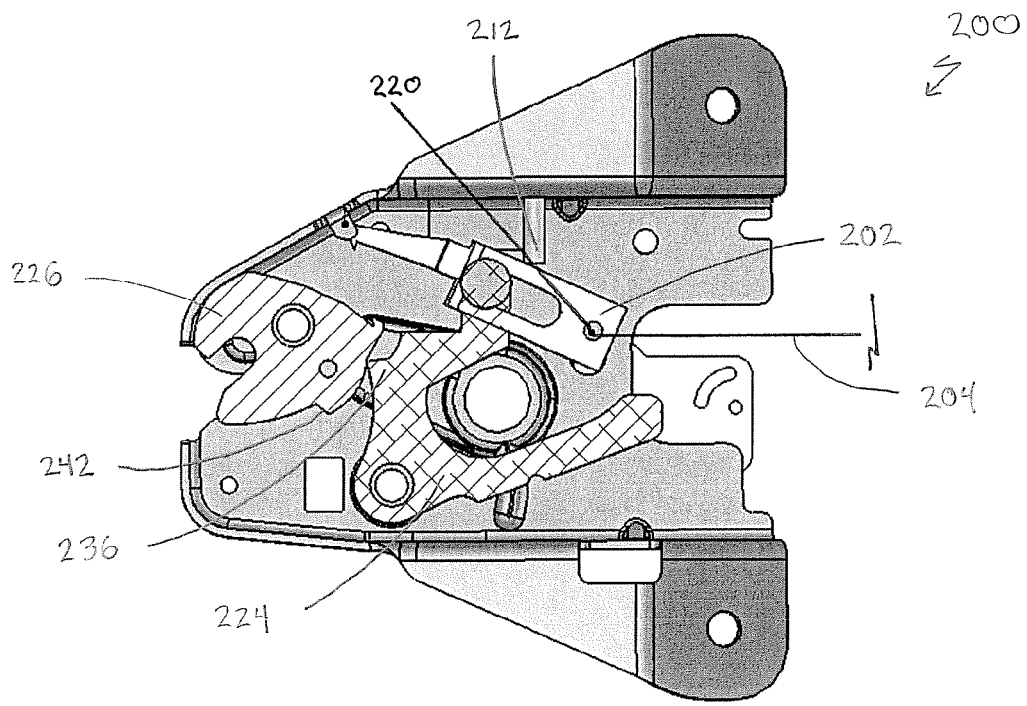
FIG. 6 is a partial side view of the device of FIG. 3 in a fourth position.

Referring to FIG. 6, when the electric current in the removed from the SMA wire(s) 204, the SMA wire(s) may cool to below its martensite transition temperature, if ambient conditions are such that allow the wire to cool. As a result, the bias force from the return spring (not shown) stretches the SMA wire(s) 204 and moves the first movable member 202 back to the first position. From this position, if the door or lid were closed, the striker 210 would engage the ratchet 226 causing the ratchet to rotate to the latched position, against the bias of its torsional spring (not shown). Once the ratchet 226 rotates sufficiently that the interface surface 242 on the ratchet 226 passed by the projection 236 on the pawl 224, the bias element (not shown) moves the projection into engagement with the interface surface as shown device in FIG. 3.

Figure 7:
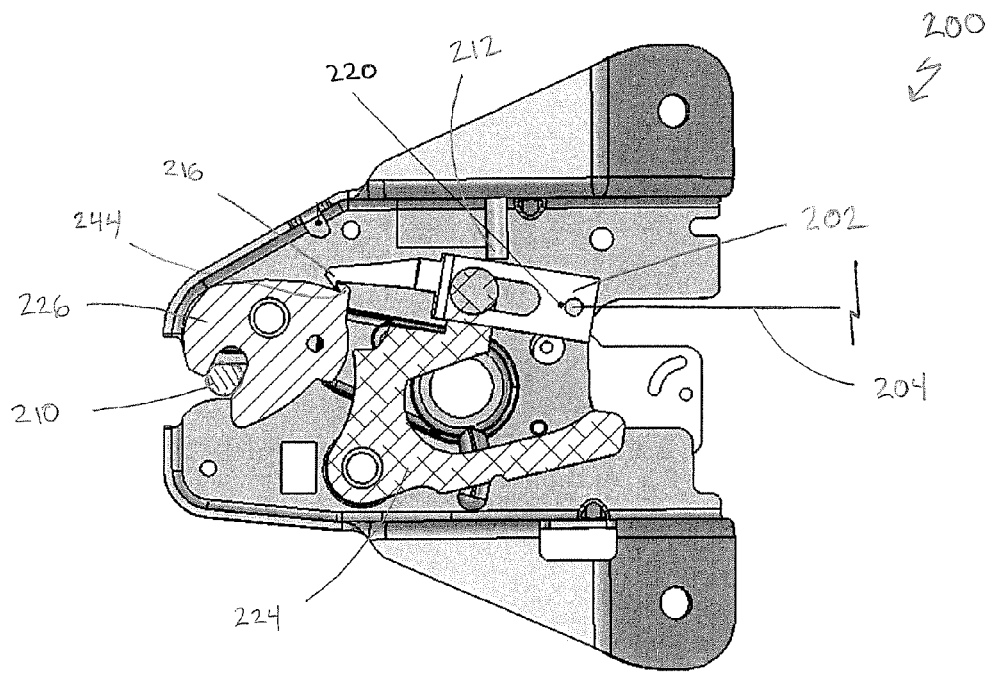
FIG. 7 is a partial side view of the device of FIG. 3 in a fifth position.
Figure 8:
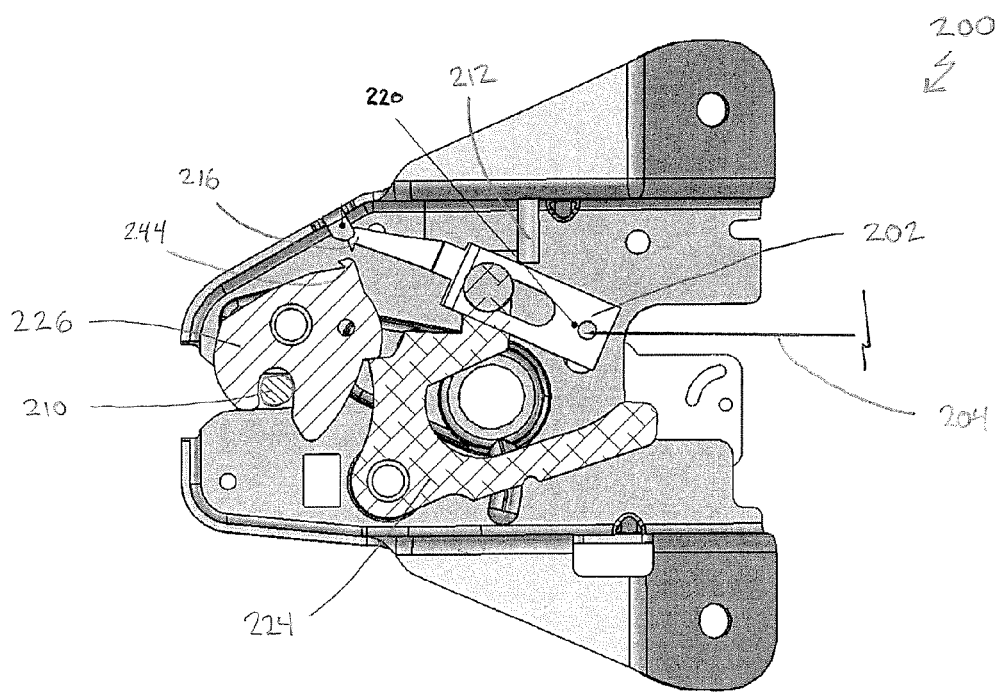
FIG. 8 is a partial side view of the device of FIG. 3 in a sixth position.

If, however, the ambient temperature surrounding the device 200 were high enough that the SMA wire(s) 204 does not cool to the martensite transition temperature, the device is configured to stress induce a state change in the SMA wire(s). Referring again to FIG. 5, when the SMA wire(s) 204 are in the austenite state, the hook 216 on the first movable member 202 is engaged with or near the hook 244 on the ratchet 226. From this position, if the door or lid were closed, the striker 210 would engage the ratchet 226 causing the ratchet to rotate to the latched position, against the bias of its torsional spring (not shown). As illustrated in FIGS. 7 and 8, when this occurs, the hook 244 on the ratchet 226 engages the hook 216 on the first movable member 202 such that the rotation of the ratchet pulls the first movable member back to its first position (shown in FIG. 8). The force applied by the striker 210 to the ratchet 226, thus, stress induces the SMA wire(s) to the martensite state and, along with the return spring, stretches the SMA wire(s) to reset the device 200.

The device 200, therefore, electrically actuates and utilizes a force from a first source (e.g. the bias element between the housing and the first movable member) to reset the device when the temperature of the SMA is below a certain amount (e.g. the martensite transition temperature) and utilizes a force from a second source (e.g. a user closing the door) to reset the device when the temperature of the SMA is at or above the amount. Thus, even when the SMA wire(s) is hotter than its martensite transition temperature, and may be unable to cool due to higher ambient conditions, the device may operate effectively by utilizing a higher load to stress induce the state change to martensite.

Figure 9:
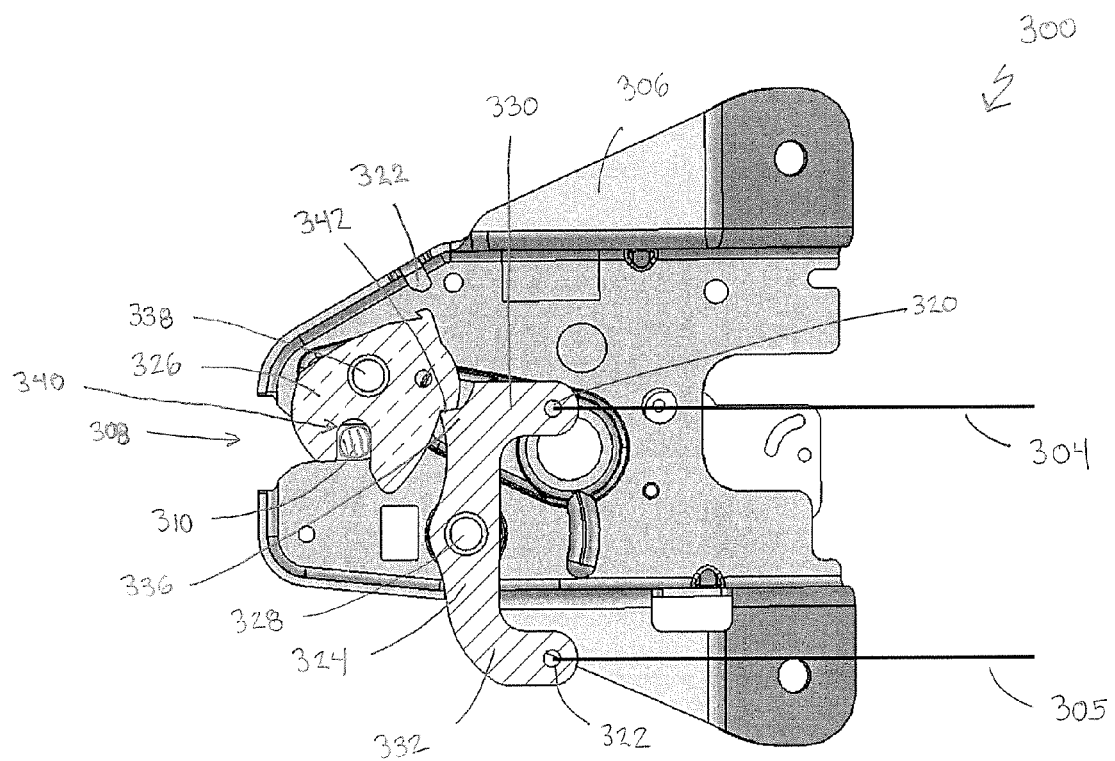
FIG. 9 is a partial side view of a third embodiment of an exemplary shape memory alloy actuated device as disclosed in the present application in a first position.
Figure 10:
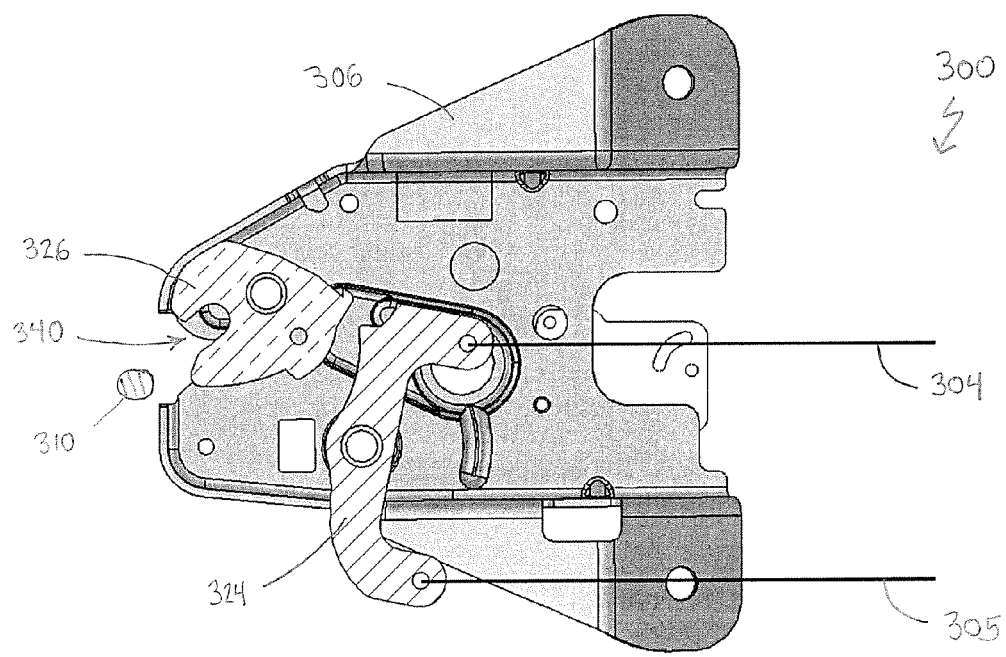
FIG. 10 is a partial side view of the device of FIG. 9 in a second position.
Figure 11:
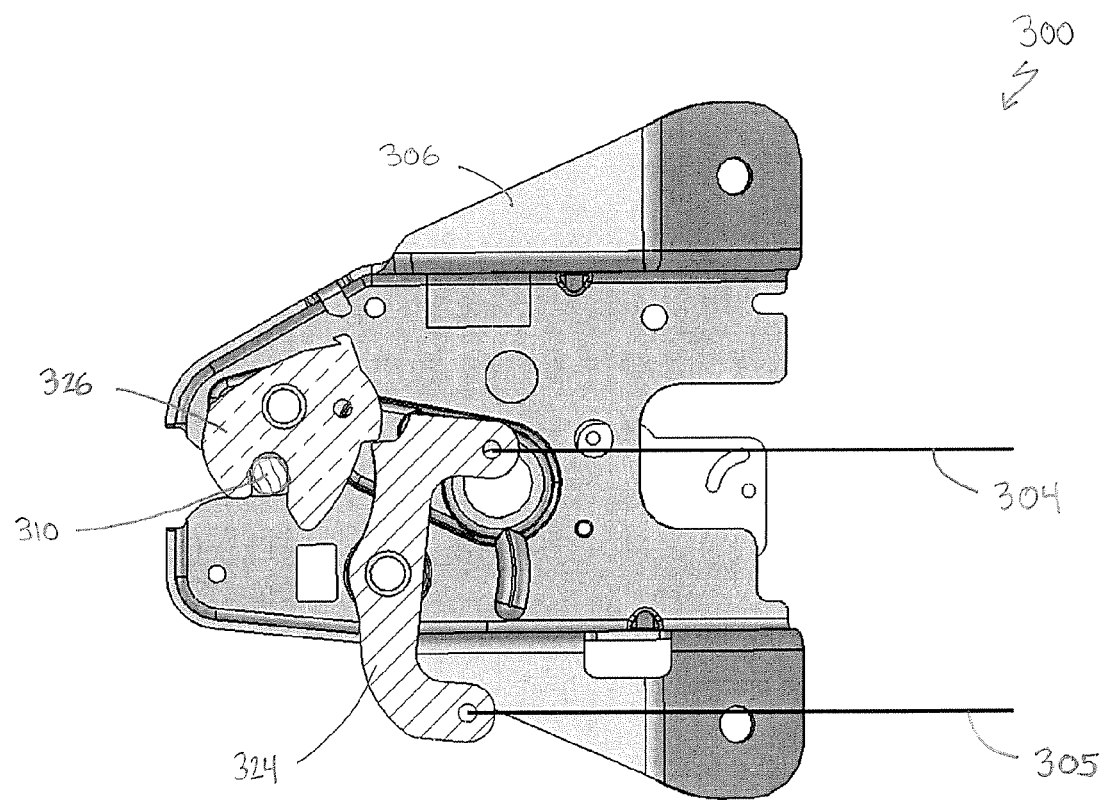
FIG. 11 is a partial side view of the device of FIG. 9 in a third position.

FIGS. 9-11 illustrate a third embodiment of an exemplary SMA actuated device 300 as disclosed in the present application. In the depicted embodiment, the device 300 is configured to releasably retain a member such as in a door or trunk latching mechanism. The principles of the device 300, however, can be used in a wide variety of applications.

Referring to FIG. 9, the device 300 includes a housing 306 configured to mount adjacent a door by any suitable means, such as, for example, fasteners. Disposed within the housing 306, is a first movable member 324 realized as a pawl that connects to at least two SMA wire(s) 304, 305 and a second movable member 326 realized as a ratchet. The pawl 324 is movable between a first position (FIG. 9) and a second position (FIG. 10). The housing 306 includes a recessed area 308 for receiving a door striker 310.

The pawl 324 and ratchet 326 may be configured in a variety of ways. Any structure that may cooperate to receive and hold a door striker may be used. In the depicted embodiment, the pawl 324 in generally U-shaped structure that is pivotally mounted to the housing 306 at a pivot point 328. The pawl 324 has a first arm 330 and a second arm 332. The first arm 330 has an attachment point 320 for the first SMA wire(s) 304 to attach to the first arm. The second arm 318 has an attachment point 322 for the second SMA wire(s) 305 to attach to the second arm.

A coil spring, torsional spring or other bias element (not shown) may be disposed between the housing 306 and the pawl 324 to bias the pawl toward the first position (i.e. in a counter-clockwise direction as illustrated in FIGS. 9-11). In the depicted embodiment, a coil spring (not shown) attaches to the housing 306 at a first attachment point 322 on the housing and attaches to the pawl 324 at the attachment point 320 on the first arm 330.

The pawl 324 includes portion for interfacing with the ratchet 326. The portion may be configured in a variety of ways. Any structure capable of interfacing with the ratchet 326 to restrict movement of the ratchet may be used. In the depicted embodiment, the portion is configured as a projection 336 extending outward from the first arm 330 toward the ratchet 326.

The ratchet 326 pivotally mounts to the housing 306 at a pivot point 338. The ratchet 326 includes a recess 340 for receiving the striker 310 and a surface 342 for interfacing with the pawl 324. A torsion spring (not shown) is disposed between the housing 306 and the ratchet 336 to bias the ratchet to an open position (i.e. in a clockwise direction as illustrated in the FIGS. 9-11).

An electric power source (not shown), such as for example, a battery, is in circuit communication with the first SMA wire(s) 304 and the second SMA wire(s) 305 in a manner that allows the power source to selectively send an electric current through the first SMA wire(s) 304 or the second SMA wire(s) 305. Separate power sources may be used for each of the SMA wires or a single source/circuit capable of sending a current to each of the SMA wires selectively, may be used. A control unit may control the application of the electric current through the SMA wires(s).

FIGS. 9-11 illustrate the operation of the device 300. Referring to FIG. 9, the device 300 is in a latched position. In the latched position, the striker 310 is positioned within the slot 308 of the housing 306 and within the recess 340 of the ratchet 326. The projection 336 on the pawl 324 is engaged with the surface 342 on the ratchet 326 such that the pawl holds the ratchet in the latched position. In the latched position, the first SMA wire(s) 304 is in the martensite state and is stretched by the bias element (not shown).

When an electric current passes through the first SMA wire(s) 304, the first SMA wire(s) heats up above its austenite transition temperature and contracts (i.e. changes to the austenite state). As shown in FIG. 10, when the first SMA wire(s) 304 contracts, it pivots the pawl 324 out of engagement with the ratchet 326. Because the ratchet 326 is biased to an open position by the a torsional spring (not shown), when the pawl 324 pivots out of engagement, the ratchet moves to an open position and ejects the striker 310 from the recess 340 (i.e. opens the door or pops the trunk lid).

Referring to FIG. 11, when the electric current in the removed from the first SMA wire(s) 304, the first SMA wire(s) may cool to below its martensite transition temperature, if ambient conditions are such that allow the wire to cool. As a result, the bias force from the return spring (not shown) stretches the first SMA wire(s) 304 and rotates the pawl 324 back into engagement with the ratchet 326. If a user closes the door or lid, the striker 310 engages the ratchet 326 causing the ratchet to rotate to the latched position, against the bias of its torsional spring (not shown). In the latched position, the pawl 324 engages the ratchet 326 to hold it in place.

If, however, the ambient temperature surrounding the device 300 is high enough that the first SMA wire(s) 304 does not cool to the martensite transition temperature, the device 300 is configured to stress induce a state change in the first SMA wire(s). The second SMA wire(s) 305 is configured to provide sufficient force on the pawl 324 when it contracts (i.e. changes state to austenite) to stress induce a state change in the first SMA wire(s) 304. Thus, when an electric current passes through the second SMA wire(s) 305, the second SMA wire(s) contracts and pivots the pawl 324 back to the position illustrated in FIG. 12.

The device 300, therefore, electrically actuates and utilizes a force from a first source (e.g. a bias element between the housing and the pawl) to reset the device when the temperature of the SMA is below a certain value (e.g. the martensite transition temperature) and utilizes a force from a second source (e.g. a electronically actuated second SMA wire(s)) to reset the device when the temperature of the SMA is at or above the value. Thus, even when the SMA wire(s) is hotter than its martensite transition temperature, and may be unable to cool due to higher ambient conditions, the device may operate effectively by utilizing a higher load to stress induce the state change to martensite.

FIGS. 12-17 illustrate a fourth embodiment of an exemplary SMA actuated device 400 as disclosed in the present application. In the depicted embodiment, the device 400 is configured as a door latching mechanism. The principles of the device 400, however, can be used in a wide variety of applications.

The device 400 includes a housing 406 configured to mount adjacent a door by any suitable means, such as fasteners for example. Disposed within the housing 406 is a first movable member 402 that connects to at least one SMA wire(s) 404. The first movable member 402 pivotally mounts to the housing 406 at a pivot point 408 and is movable between a first position and a second position.

The first movable member 402 may be configured in a variety of ways. Any structure capable of linking the SMA wire(s) 404 to one or more sources of force and interfacing with a door may be used. In the depicted embodiment the first movable member 402 is configured as a striker for engaging a portion of a door 410 to hold the door in a closed position.

The first movable member 402 includes a first attachment point 412 used to attach to the SMA wire(s) 404 and a second attachment point 414 used to attach to a first source of force, realized in the depicted embodiment, as a biasing element 416 such as a coil spring. The biasing element 416 is disposed between the housing 406 and the first movable member 402 to bias the first movable member toward the first position. The biasing element 416 and the SMA wire(s) 404 may attach in any suitable manner. In the depicted embodiment, the biasing element 416 is attaches to the housing 406 at a pin 418 and attaches to the first movable member 402 at the second attachment point 414 realized as an opening. The first movable member 402 also includes an engagement surface 422 (see FIG. 13) adapted to engage a portion of the door 410.

Figure 14:
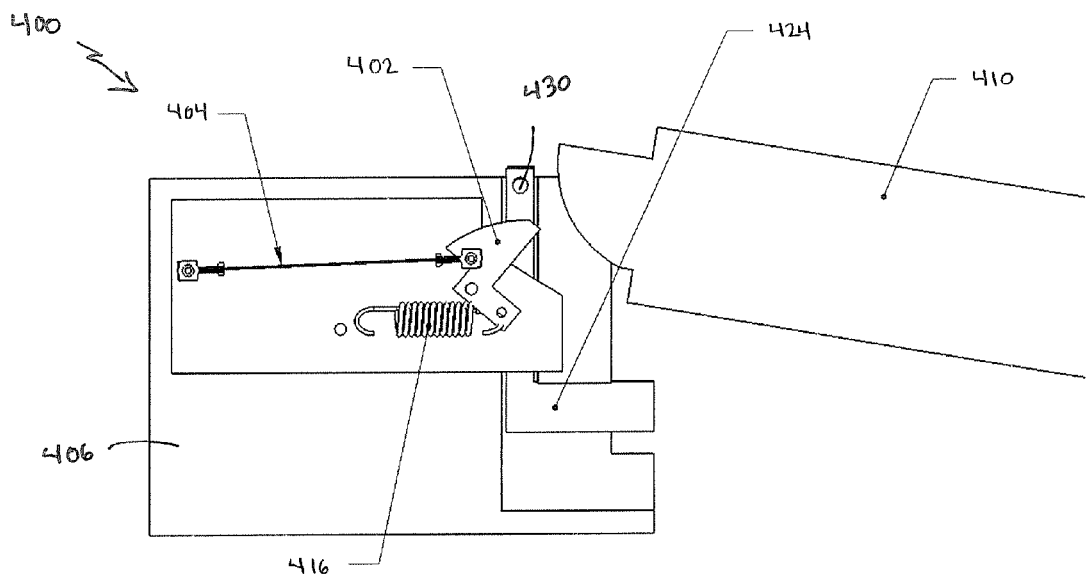
FIG. 14 is a partial side view of the device of FIG. 12 in a third position.

The device 400 also includes a second movable member 424. The second movable member 424 may be configured in a variety of ways. Any device capable transferring force to the shape memory alloy wire(s) 404 from a second source of force may be used. In the depicted embodiment, the second movable member 424 is a reset cam adapted to transfer force from the door 410, through the first movable member 402 and to the SMA wire(s) 404 to induce a state change in the SMA wire(s). The cam 424 is a generally an L-shaped structure having a first arm 426 extending generally perpendicular to a second arm 428. The first arm 426 includes a projection or pin 430 at its distal end. The cam 424 is slideably received in an angled groove 432 in the housing 406 (best viewed in FIGS. 16 and 17) and is movable between a first position (FIG. 12) and a second position (FIG. 14).

A bias element (not shown), such as a coil spring, biases the cam 424 toward the second position (upward as illustrated in FIGS. 12-17). An electric power source (not shown), such as for example, a battery, is in circuit communication with the SMA wire(s) 404 in a manner that allows the power source to send an electric current through the SMA wire(s). A control unit may control the application of the electric current through the SMA wires(s).

Figure 12:
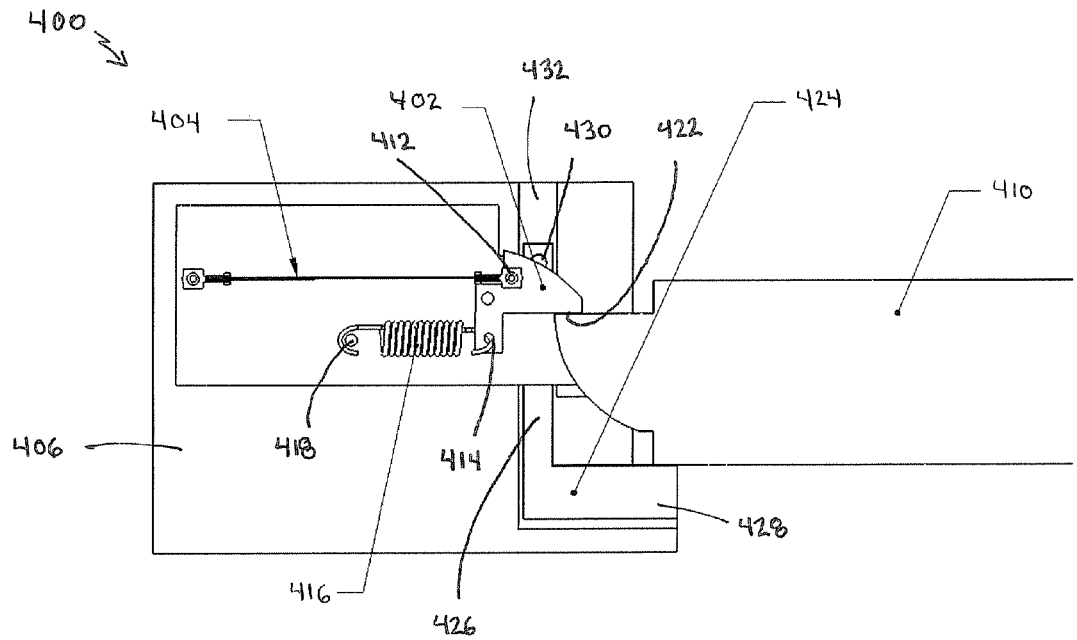
FIG. 12 is a partial side view of a fourth embodiment of an exemplary shape memory alloy actuated device as disclosed in the present application in a first position.
Figure 17:
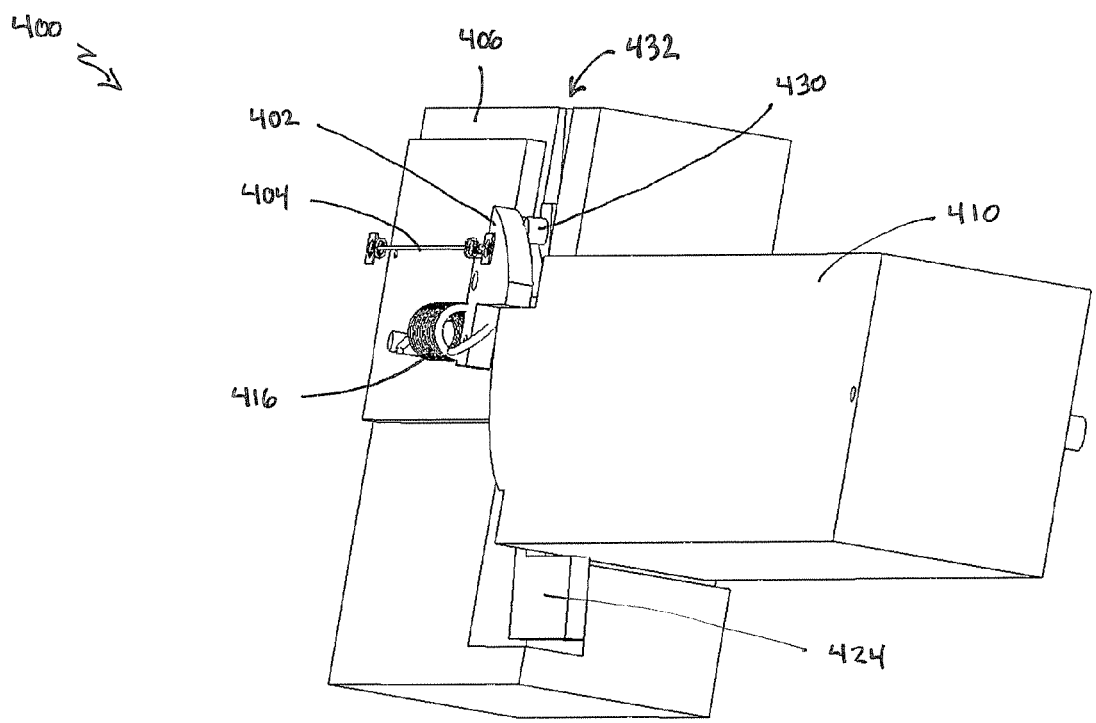
FIG. 17 is a partial perspective view of the device of FIG. 12 in the first position.

Referring to FIGS. 12 and 17, the device 400 is in the closed or latched position. In this position, the first movable member 402 and the second movable member 424 are in their first position and the SMA wire(s) 404 is in its martensite state (stretched by the bias element 418). The door 410 is in a closed position and held in place by the engagement surface 422 of the first movable member 402. The pin 430 on the cam 424 is position behind and out of engagement with the first movable member 402.

Figure 13:
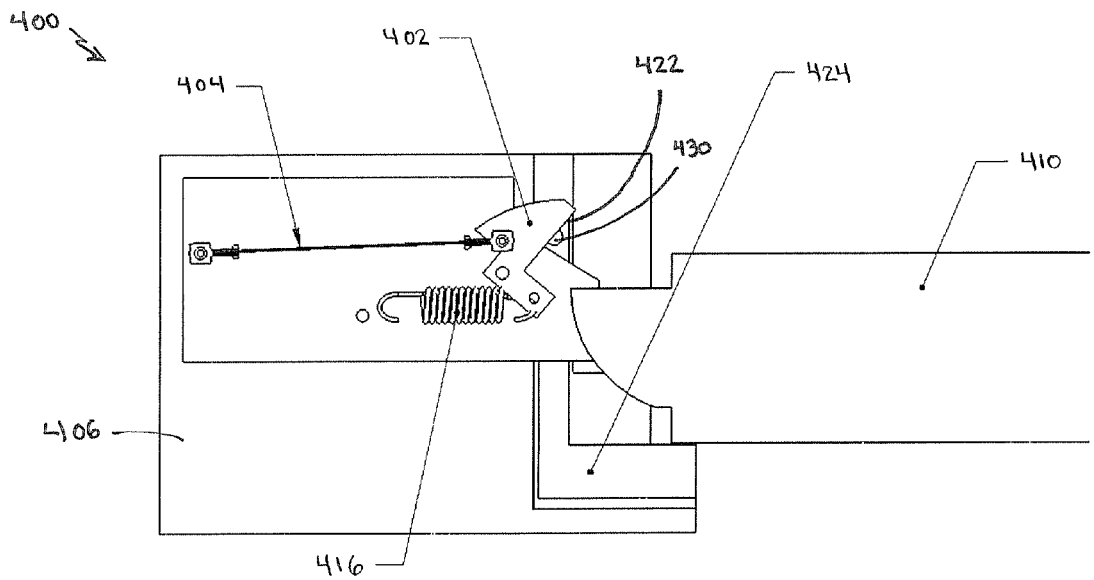
FIG. 13 is a partial side view of the device of FIG. 12 in a second position.

Referring to FIG. 13, when an electric current passes through the SMA wire(s) 404, the SMA wire(s) heats up to a temperature at or above its austenite transition temperature and contracts (i.e. changes to the austenite state). When the SMA wire(s) 404 contracts, it pivots the first movable member 402 to its second position, which is out of engagement with the door 410.

Referring to FIG. 14, when the first movable member 402 is in the second position, the door 410 may be opened, for example, by a user. The door 410 may also be opened by the second movable member 424 as it is biased to its second position by the biasing element (not shown).

Figure 15:
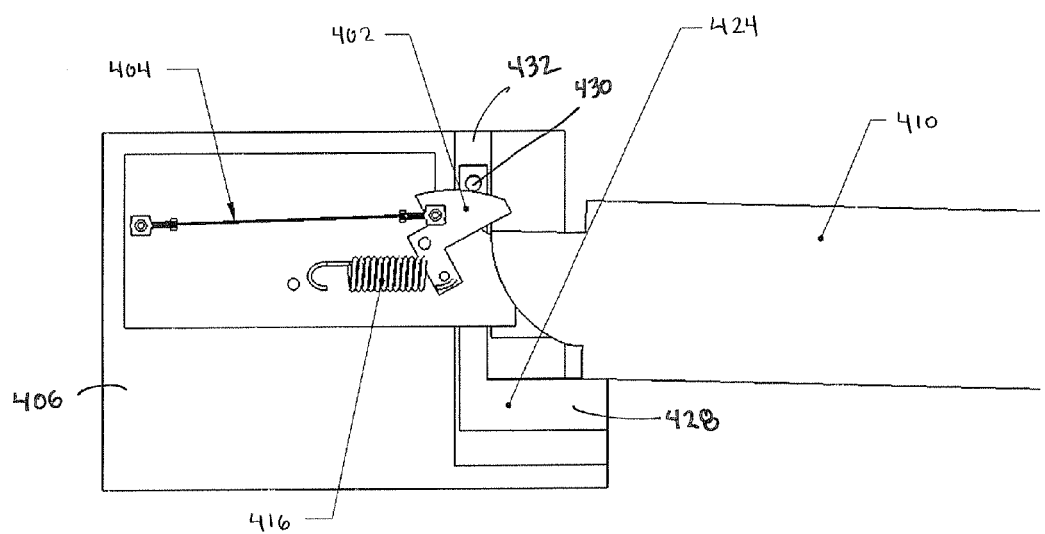
FIG. 15 is a partial side view of the device of FIG. 12 in a fourth position.
Figure 16:
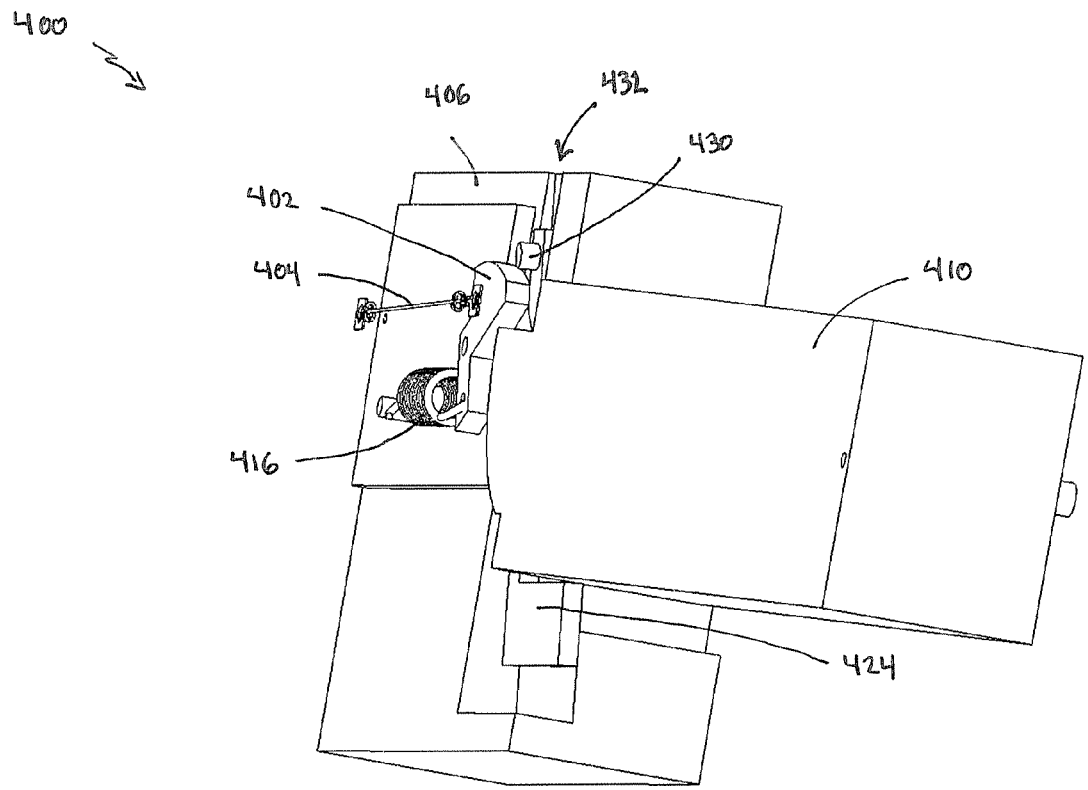
FIG. 16 is a partial perspective view of the device of FIG. 12 in the fourth position.

Referring to FIGS. 15 and 16, when the electric current in the removed from the SMA wire(s) 404, the SMA wire(s) may cool to below its martensite transition temperature, if ambient conditions are such that allow the wire to cool. As a result, the bias force from the bias element 416 stretches the SMA wire(s) 404 and rotates the first movable member 402 back to the first position, thus resetting the device 400.

If, however, the ambient temperature surrounding the device 400 is high enough that the SMA wire(s) 404 does not cool to the martensite transition temperature, the device 400 is configured to stress induce a state change in the first SMA wire(s). When the second movable member 424 is in the second position, the pin 430 is in a position adjacent the first movable member 402 and engageable with the first movable member, due to the angle of the groove 432. As the door 410 is closed by a second source of force, such as for example, a user, the door engages the second arm 428 of the second movable member 424 forcing the second movable member back to its first position. As the second movable member 424 moves to the first position, the pin 430 engages the first movable member 402 and forces the first movable member to its first position. As a result, the force from the second source is transferred through the second movable member 424 to stress induces a state change in the SMA wire(s) 404 and stretches the SMA wires(s) out.

The device 400, therefore, electrically actuates and utilizes a force from a first source (e.g. a bias element 416) to reset the device when the temperature of the SMA is below a certain amount (e.g. the martensite transition temperature) and utilizes a force from a second source (e.g. an end user closing the door) to reset the device when the temperature of the SMA is at or above the amount. Thus, even when the SMA wire(s) is hotter than its martensite transition temperature, and may be unable to cool due to higher ambient conditions, the device may operate effectively by utilizing a higher load to stress induce the state change to martensite.

FIGS. 18-23 illustrate a fifth embodiment of an exemplary SMA actuated device 500 as disclosed in the present application. In the depicted embodiment, the device 500 is configured as a door latching mechanism. The principles of the device 500, however, can be used in a wide variety of applications and are not limited to a door latching mechanism.

The device 500 includes a first movable member 502 that connects to at least one SMA wire(s) 504. The first movable member 502 is movable between a first vertical position and a second vertical position. The first movable member 502 is biased toward the first position (downward in the Figures) by a first force source 506 realized as a bias element, such as, but not limited to, a spring. The first movable member 502 may be configured in a variety of ways. Any structure capable of linking the SMA wire(s) 504 to one or more sources of force may be used. In the depicted embodiment the first movable member 502 is configured as a generally rectangular component having a first coupling portion 508 for attaching to the SMA wire(s) and a second coupling portion 510 for connecting to a second movable member 512. The first coupling portion 508 is realized as a projection or pin extending from the first movable member 502 to engage the SMA wire(s) 504 at a point along the length of the wire(s). The second coupling portion 510 is realized as a projection or pin extending from the first movable member 502 to engage the second movable member 512.

The second movable member 512 is movably attached to the first movable member 502 and is movable between a first horizontal position and a second horizontal position. The second movable member 512 may be configured in a variety of ways. In the depicted embodiment, the second movable member 512 is realized as a door lock slide having a body portion 514 and an engagement portion 516 realized as a latch for engaging a door frame or strike plate. The body portion 514 is generally rectangular and includes a guide path or groove 520 that receives the pin 510 of the first movable member 502. The path 520 has a lower section 522 that extends generally parallel to an upper section 524. A generally linear side section 526 connects the upper and lower sections 522, 524 at a first end of the path, and a generally curved side section 528 connects the upper and lower sections at a second end of the path.

At the intersection between the generally linear side section 526 and the upper section 524 is a first one-way door 530 and at the intersection between the generally curved side section 528 and the upper section 524 is a second one-way door 532. The first and second one-way doors 530, 532 allow the pin 510 to pass the doors in only one direction (illustrated as clockwise in FIGS. 18-23).

The second movable member 512 is biased toward the second position (to the right as illustrated in FIGS. 18-23) by a bias element 534, such as, but not limited to, a spring. An electric power source (not shown), such as for example, a battery, is in circuit communication with the SMA wire(s) 504 in a manner that allows the power source to send an electric current through the SMA wire(s). A control unit may control the application of the electric current through the SMA wires(s).

Figure 18:
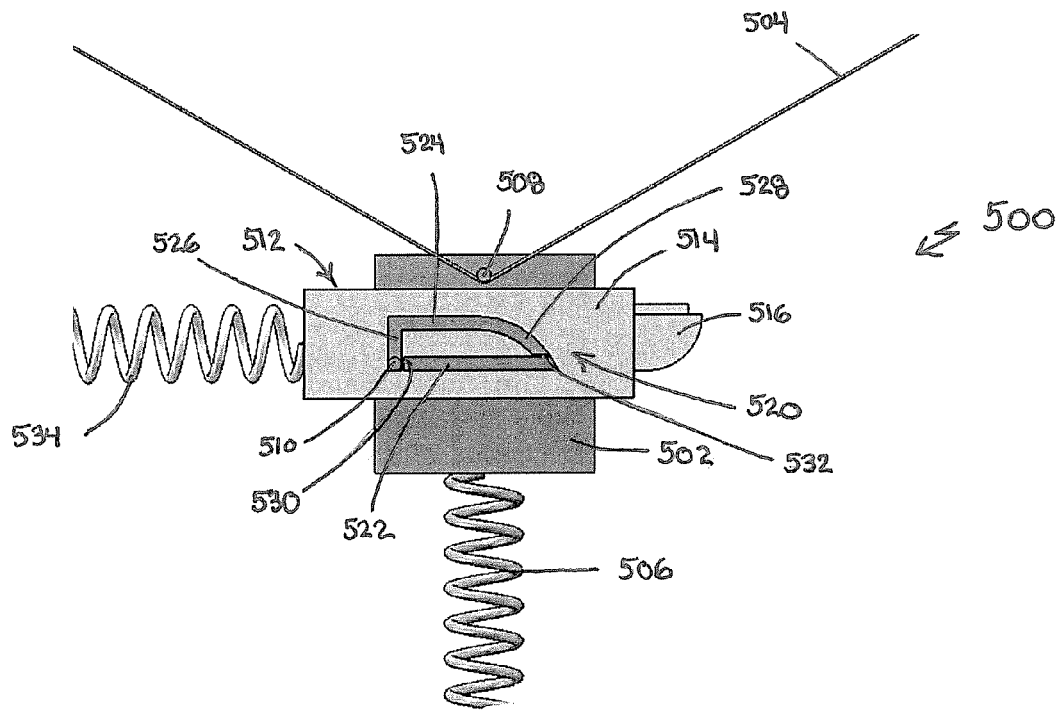
FIG. 18 is a partial side view of a fifth embodiment of an exemplary shape memory alloy actuated device as disclosed in the present application in a first position.

FIG. 18 illustrates the device 500 in a closed or latched position. In this position, the SMA wire(s) 504 is in its martensite state, stretched out by the bias element 506. Thus, the first movable member 502 is in its first or lower vertical position. The second movable member 512 is in its first or "right" horizontal position. In this position, the pin 510 is in the linear section 526 of the path 520, which prevents horizontal movement of the second movable member 512.

Figure 19:
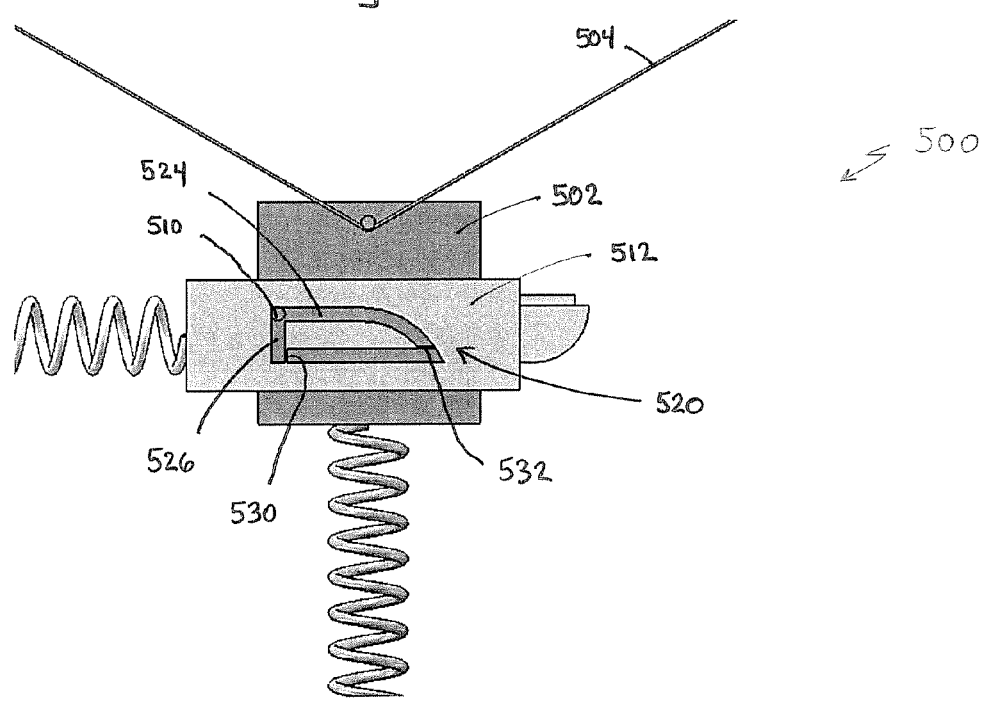
FIG. 19 is a partial side view of the device of FIG. 18 in a second position.

Referring to FIG. 19, when an electric current passes through the SMA wire(s) 504, the SMA wire(s) heats up to a temperature at or above its austenite transition temperature and contracts (i.e. changes to the austenite state). When the SMA wire(s) 504 contracts, it moves the first movable member 502 to its second or upper vertical position, which moves the pin 510 along the path 520 to the intersection of the generally linear side section 526 and the upper section 524.

Figure 20:
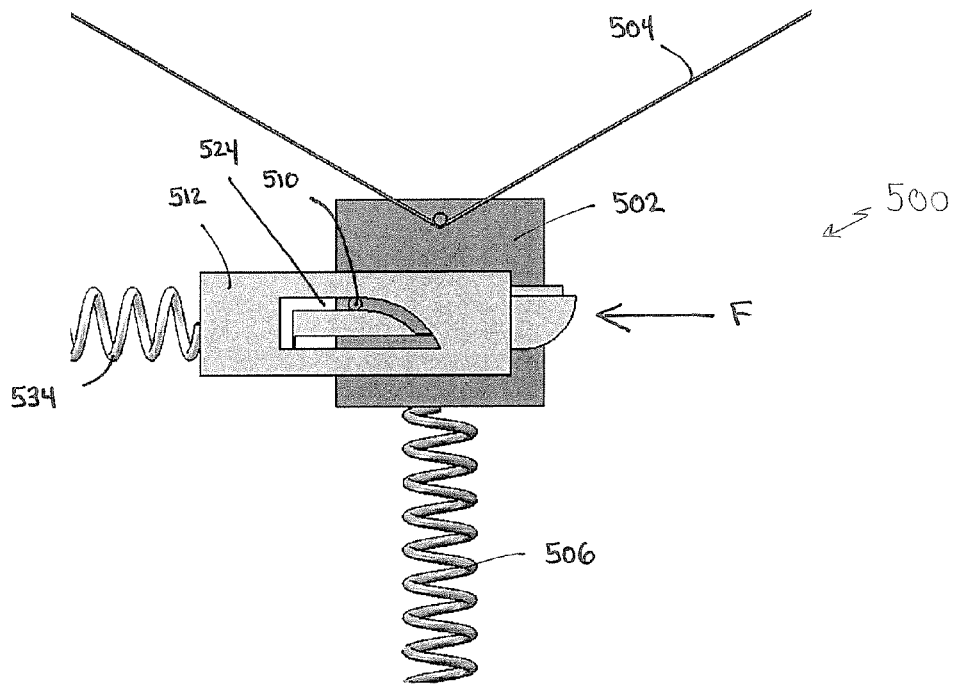
FIG. 20 is a partial side view of the device of FIG. 18 in a third position.

Referring to FIG. 20, from the position of FIG. 19, a force from a second force source on the second movable member 512 that is sufficient to overcome the bias force of the spring 534 can move the second movable member from its first or far right position, toward its second or far left position. For example, the device 500 may in installed in a door. The handle mechanism for the door (not shown) may be linked to the second movable member 512 such that actuating the handle mechanism imparts sufficient force to the second movable member to compress the spring 534 and move the second movable member toward the its second horizontal position.

Figure 21:
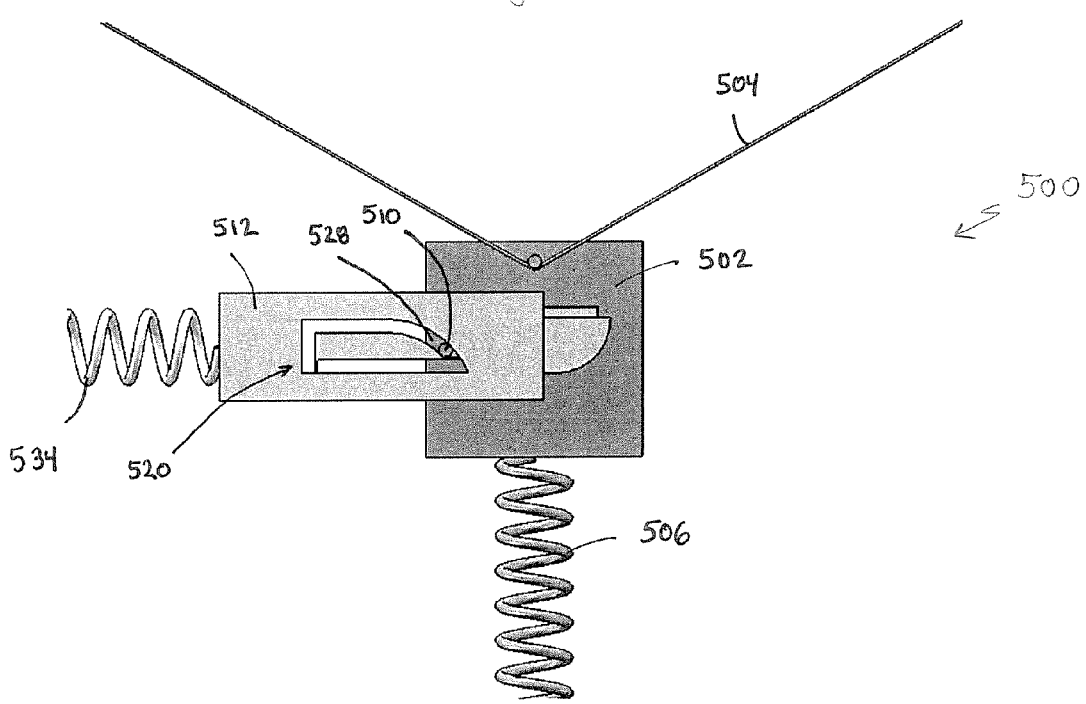
FIG. 21 is a partial side view of the device of FIG. 18 in a fourth position.

Referring to FIG. 21, as the second movable member 512 moves horizontally relative to the first movable member 502, the pin 510 reaches and travels through the curved section 528 of the path 520. As the second movable member 512 is moved horizontally, the first movable member 502 is forced downward by the curved profile of the curved section 528 of the path 520, back toward its first or lower vertical position. As a result, the device 500 stress induces a state change in the first SMA wire(s) 504.

Figure 22:
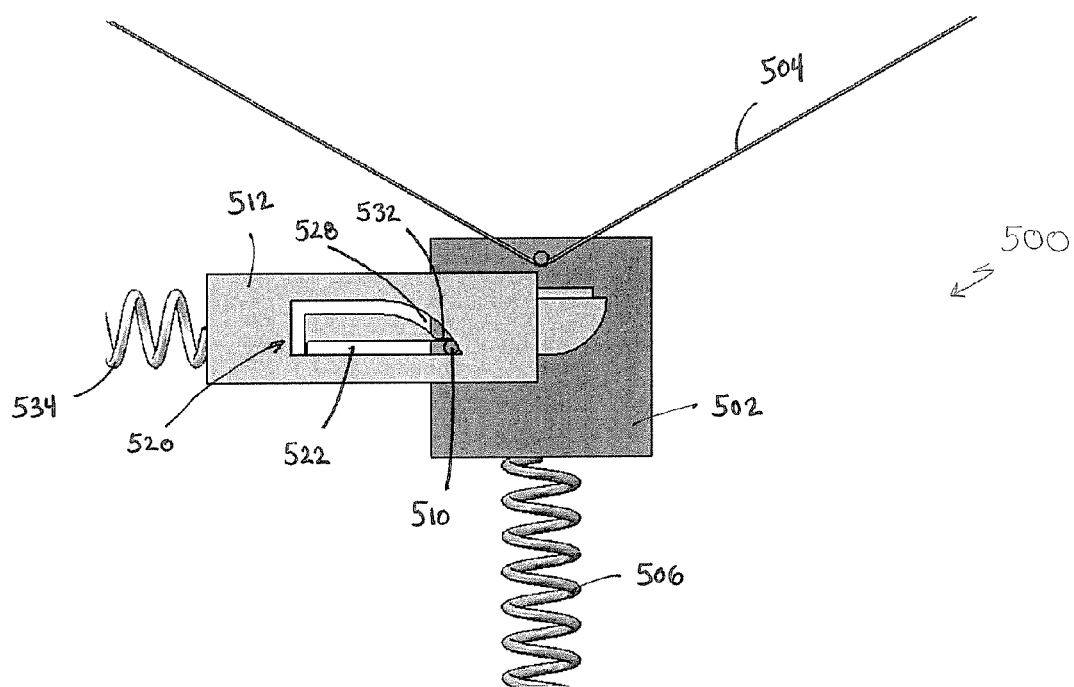
FIG. 22 is a partial side view of the device of FIG. 18 in a fifth position.

Referring to FIG. 22, as the SMA wire(s) is stretched, the pin 510 passes through the second one-way door 532 at the intersection between the curved section 528 and the lower section 522 of the path 520. The second one-way door 532 allows the pin 510 to pass to the intersection, but does not allow the pin to move back upward into the curved section 528.

Figure 23:
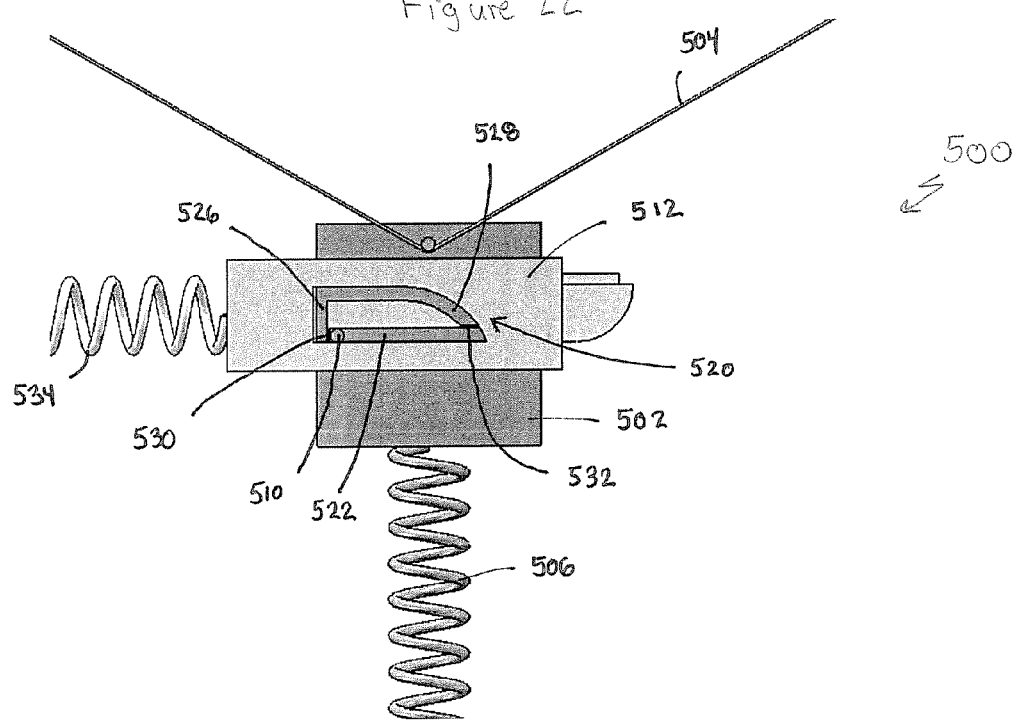
FIG. 23 is a partial side view of the device of FIG. 18 in a sixth position, about to get back to the first position.

Referring to FIG. 23, with the pin 510 at the intersection between the curved section 528 and the lower section 522 of the path 520, the first movable member 502 is in its first position, and the second movable member 512 is in its second position. If the force from the second source is removed or reduced sufficiently, the bias element 534 will move the second movable member 512 back toward its first or far right position. As this movement continues, the pin 510 passes through the first one-way door 530 at the intersection between the generally linear side section 526 and the lower section 522. The first one way door 532 allows the pin 510 to pass through, but does not allow the pin to move back along the lower section 522.

In the embodiments described herein, the SMA material selected for the SMA members(s) may be any suitable SMA, such as for example, nitinol. Flexinol®, which are registered trademarks of Dynalloy, Inc., has been found to be a suitable SMA. Other SMA materials, however, may be used and may be selected to provide different temperature actuation ranges, based on availability, or for any other reason without departing from the spirit and scope of the invention. Other SMAs materials include, but are not limited to, copper/zinc/aluminum, copper/aluminum/nickel, silver/cadmium, gold/cadmium, copper/tin, copper/zinc, indium/titanium, nickel/aluminum, iron/platinum, manganese/copper, iron/manganese/silicon, nickel/titanium/hafnium, nickel/titanium/palladium, and other nickel/titanium alloys.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A shape memory alloy actuated device, comprising:
a movable member movable between a first position and a second position;
at least one shape memory alloy (SMA) member connected to the movable member, wherein the at least one SMA member moves the movable member from the first position to the second position when the at least one SMA member is heated above a first temperature and contracts;
wherein a force from a bias element biases the movable member from the second position toward the first position and, when the at least one SMA member is at or below a second temperature, stretches the SMA member and moves the movable member from the second position to the first position; and wherein, while the movable member is in the second position, a force from a source of force external to the device is coupled to the SMA member, the resulting force being applied to the at least one SMA member being higher than a force applied by the bias element to stretch the at least one SMA member and stress induce the at least one SMA member to change state from austenite to martensite when the temperature of the at least one SMA member is hotter than the martensite transition temperature of the at least one SMA member under the bias element force.

2. The device of claim 1 wherein the at least one shape memory alloy member moves the movable member from the first position to the second position in response to being heated to the first temperature by an electric current passing through the at least one shape memory alloy member.

3. The device of claim 1 wherein the source of force external to the device that stress induces the at least one SMA member to change state from austenite to martensite comprises a source of force manually applied by a user of the device.

4. The device of claim 1 wherein the second temperature is a martensite transition temperature.

5. The device of claim 1 wherein the second temperature is an austenitic temperature.

6. The device of claim 1 further comprising a ratchet adapted to receive and retain a striker of a door or lid and a pawl adapted to engage the ratchet when the movable member is in the first position and disengage the ratchet to release the door or lid when the first movable member moves to the second position.

7. The device of claim 6 wherein the source of force external to the device that stress induces the at least one SMA member to change state from austenite to martensite is coupled to the SMA member via the ratchet and further comprising an engagement portion on the ratchet for interfacing with the movable member to couple force from the ratchet to the SMA member to stretch the at least one SMA member and stress induce the at least one SMA member to change state from austenite to martensite while the movable member is in the second position.

8. The device of claim 1 further comprising a second movable member slideably movable along an angle groove, the second movable member adapted to transmit force from the source of force external to the device to the movable member to stress induce the at least one SMA member to change state from austenite to martensite.

9. The device of claim 1 further comprising a pivotal member that is positioned and arranged to transmit the force from the source of force external to the device to move the movable member from the second position to the first position when the shape memory alloy member is above the first temperature and further positioned and arranged to thereafter disengage the force from the source of force external to the device to permit the movable member to be moved from the first position to the second position.

10. A shape memory alloy actuated device, comprising:
a movable member movable between a first position and a second position;
at least one shape memory alloy (SMA) member connected to the movable member, wherein the at least one SMA member moves the movable member from the first position to the second position when the at least one SMA member is heated above its austenite transition temperature;
a first means for biasing the movable member from the second position toward the first position and, when the at least one SMA member is below its martensite transition temperature, for stretching the SMA member and moving the movable member from the second position to the first position; and
a second means for, while the movable member is in the second position, applying a force to the SMA member, the resulting force being applied to the at least one SMA member being higher than a force applied by the first means, to stretch the at least one SMA member and stress induce the at least one SMA member to change state from austenite to martensite when the temperature of the at least one SMA member is hotter than the martensite transition temperature of the at least one SMA member under the force of the first means.

11. A method for moving an movable actuator member between a first position and second position, comprising:
heating a shape memory alloy (SMA) member, which is connected to the movable actuator member, to a first temperature by running an electric current through the SMA member to move the movable actuator member from the first position to the second position;
when the SMA member is below a second temperature, applying a first amount of tensile load from a first source to the SMA member to stretch the SMA member and move the movable actuator member from the second position to the first position; and
while the movable actuator member is in the second position, applying an amount of tensile force from a second source to the SMA member, the resulting force being applied to the at least one SMA member being higher than the force applied by the first source to stretch the at least one SMA member and stress induce the at least one SMA member to change state from austenite to martensite when the temperature of the at least one SMA member is hotter than the martensite transition temperature of the at least one SMA member under the force of the first means.

12. A shape memory alloy actuated device for securing a door or lid, comprising:
a housing;
a link disposed within the housing, the link being movable between a first position and a second position and including a first coupling portion;
at least one shape memory alloy (SMAtwire having a first end fixed relative to link and a second end connected to the link, wherein the SMA wire contracts and moves the link from the first position to the second position when the SMA wire is heated above a first temperature;
a spring attached to the link and oriented to provide a first tensile force to the SMA wire; wherein, when the shape memory alloy wire cools to below a second temperature, the spring stretches the shape memory alloy wire and moves the link from the second position to the first position; and
a ratchet pivotally attached to the housing and adapted to receive a striker of the door or lid, the ratchet having a second coupling portion for engagement of the first coupling portion of the link when the link is in the second position;
wherein, while the link is in the second position and the second coupling portion of the ratchet engages the first coupling portion of the link, as the striker is received into the ratchet, the ratchet pivots and the movement of the ratchet is coupled to the SMA member via the link, with the resulting force being applied to the at least one SMA member being higher than a force applied by the spring to stretch the at least one SMA member and stress induce the at least one SMA member to change state from austenite to martensite when the temperature of the at least one SMA member is hotter than the martensite transition temperature of the at least one SMA member under the spring bias.

13. The device of claim 12 further comprising a pawl pivotally attached to the housing, wherein the pawl engages and restricts movement of the ratchet to hold the door or lid when the link is in the first position and disengages the ratchet to release the door or lid when the link moves to the second position.

14. A shape memory alloy actuated device, comprising:
- a movable member movable between a first position and a second position;
- at least one shape memory alloy (SMA) member connected to the movable member, wherein the at least one SMA member moves the movable member from the first position to the second position when the at least one SMA member is heated above a first temperature and contracts;
- wherein a force from a bias element biases the movable member from the second position toward the first position and, when the at least one SMA member is at or below a second temperature, stretches the SMA member and moves the movable member from the second position to the first position; and
- wherein, while the movable member is in the second position, a force from a second source of force is coupled to the SMA member, the resulting force being applied to the at least one SMA member being higher than a force applied by the bias element to stretch the at least one SMA member and stress induce the at least one SMA member to change state from austenite to martensite when the temperature of the at least one SMA member is hotter than the martensite transition temperature of the at least one SMA member under the bias element force.

15. The device of claim 14 wherein the second source of force that stress induces the at least one SMA member to change state from austenite to martensite comprises at least one other shape memory alloy member.

16. The device of claim 6 wherein the source of force external to the device that stress induces the at least one SMA member to change state from austenite to martensite comprises a source of force manually applied by a user of the device.

17. The device of claim 16 wherein the source of force external to the device that stress induces the at least one SMA member to change state from austenite to martensite comprises a source of force manually applied as the user closes the door or lid.

18. The device of claim 6 wherein the source of force external to the device that stress induces the at least one SMA member to change state from austenite to martensite comprises a source of force applied to the door or lid.

19. The device of claim 7 wherein the source of force external to the device that stress induces the at least one SMA member to change state from austenite to martensite comtprises a source of force manually applied by a user of the device.

20. The device of claim 8 wherein the source of force external to the device that stress induces the at least one SMA member to change state from austenite to martensite comprises a source of force manually applied by a user of the device.

21. The device of claim 9 wherein the source of force external to the device that stress induces the at least one SMA member to change state from austenite to martensite comtprises a source of force manually applied by a user of the device.

22. The method of claim 11 wherein the tensile force from the second source applied to the SMA member to stretch the at least one SMA member and stress induce the at least one SMA member to change state from austenite to martensite is manually applied by a user closing a door or lid opened in response to the movable actuator member moving from the first position to the second position.

* * * * *

UNITED STATES PATENT AND TRADEMARK OFFICE
CERTIFICATE OF CORRECTION

| | | |
|---|---|---|
| PATENT NO. | : 8,341,958 B2 | Page 1 of 1 |
| APPLICATION NO. | : 11/782939 | |
| DATED | : January 1, 2013 | |
| INVENTOR(S) | : James Holbrook Brown et al. | |

It is certified that error appears in the above-identified patent and that said Letters Patent is hereby corrected as shown below:

In the Specifications:

Column 14, line 46, after "alloy" please delete "(SMAtwire" and insert -- (SMA) wire --.

Signed and Sealed this
Fourth Day of June, 2013

Teresa Stanek Rea
*Acting Director of the United States Patent and Trademark Office*